(12) United States Patent
Knappmann (10) Patent No.: US 8,116,192 B2
(45) Date of Patent: Feb. 14, 2012

(54) OPTICAL RECORDING MEDIUM WITH WRITE-ONCE AND REWRITABLE PROPERTIES

(75) Inventor: Stefan Knappmann, Rottweil (DE)

(73) Assignee: Thomson Licensing, Issy-les-Moulineaux (FR)

( * ) Notice: Subject to any disclaimer, the term of this patent is extended or adjusted under 35 U.S.C. 154(b) by 184 days.

(21) Appl. No.: 12/589,276

(22) Filed: Oct. 21, 2009

(65) Prior Publication Data
US 2010/0118681 A1 May 13, 2010

(30) Foreign Application Priority Data
Nov. 13, 2008 (EP) .................................... 08305801

(51) Int. Cl.
*G11B 7/24* (2006.01)
(52) U.S. Cl. .................................................. 369/275.2
(58) Field of Classification Search ........................ None
See application file for complete search history.

(56) References Cited

U.S. PATENT DOCUMENTS

| | | | | |
|---|---|---|---|---|
| 4,944,037 A * | 7/1990 | Ando | .......................... | 369/13.24 |
| 5,166,913 A * | 11/1992 | Ichiyama | .................... | 369/13.02 |
| 5,544,137 A * | 8/1996 | Ohara et al. | .................. | 369/47.5 |
| 6,788,635 B1 * | 9/2004 | Aratani et al. | ................. | 369/100 |
| 6,841,218 B2 * | 1/2005 | Hosoda et al. | ................ | 428/64.1 |

FOREIGN PATENT DOCUMENTS

JP 02 156435 A 6/1990

OTHER PUBLICATIONS

Search Report dated Feb. 18, 2009.

* cited by examiner

*Primary Examiner* — Christopher R Lamb
(74) *Attorney, Agent, or Firm* — Myers Wolin, LLC (57) ABSTRACT

A write-once optical recording medium is described, which in addition to the write-once properties also has rewritable properties. The optical recording medium has a recording layer with at least a first recording sublayer and a second recording sublayer for recording information marks by alloying material of the at least first and second recording layers. The materials of the at least first and second recording sublayers are chosen such that the alloyed material is a phase-change material adapted for recording additional data as phase changes of the alloyed material.

14 Claims, 5 Drawing Sheets

OPTICAL RECORDING MEDIUM WITH WRITE-ONCE AND REWRITABLE PROPERTIES

FIELD OF THE INVENTION

This application claims the benefit, under 35 U.S.C. §119, of European Patent Application No. 08305801.6 filed 13 Nov. 2009.

The present invention relates to a write-once optical recording medium, which in addition to the write-once properties also has rewritable properties.

BACKGROUND OF THE INVENTION

Conventional recordable optical recording media can be divided into write-once optical recording media (WO-media) and rewritable optical recording media (RW-media). A plurality of recording materials for both types of media are known. For example, WO-media are typically realized using organic dyes, metal oxides and nitrides, or bilayers such as a Cu/Si bilayer. RW-media are generally realized using phase-change materials such as $Ge_2Sb_2Te_5$ or $Ag_3In_5Sb_{71}Te_{21}$. Usually a single phase-change layer is used.

Though phase-change layers are typically used for RW-media, they may likewise be used for WO-media. For example, U.S. Pat. No. 6,841,218 discloses the usage of two adjacent recording sublayers of a phase-change material for a write-once optical recording medium. The first recording sublayer comprises a first composition which can be changed into another composition more stable in an amorphous state by combining with a component included in the second recording sublayer.

A further optical recording medium having two recording sublayers is disclosed in U.S. Pat. No. 5,796,708. Information marks are recorded on the medium by alloying material of the two recording sublayers using a light beam.

Still a further optical recording medium having two recording sublayers is disclosed in JP 02-156435. The medium has two layers. A first layer is a stable phase-change layer and serves as a write-once layer. Using an increased beam energy the first layer and the second layer are alloyed to form a rewritable phase-change layer. In order to enable rewritable recording in a rewritable area, an initialization step is necessary to alloy the two layers. As a result, some parts of the optical recording medium serve as a write-once area, whereas other parts of the optical recording medium serve as a rewritable area.

For some applications it would be desirable to have an optical recording medium which has write-once properties as well as rewritable properties in the same area.

SUMMARY OF THE INVENTION

It is thus an object of the invention to propose write-once optical recording medium which offers at least a partial additional rewritability.

According to the invention, this object is achieved by an optical recording medium with a recording layer having at least a first recording sublayer and a second recording sublayer for recording information marks by alloying material of the at least first and second recording layers, wherein the materials of the at least first and second recording sublayers are chosen such that the alloyed material is a phase-change material adapted for recording additional data as phase changes of the alloyed material.

The optical recording medium according to the invention has write-once properties as well as rewritable properties. Though the rewritability is limited, it can be used for special applications. For example, the proposed structure of the optical recording medium allows to add additional optional functionality for content protection and tracking of media that have been recorded in manufacturing on demand (MOD) conditions. A more detailed explanation will be given below with reference to specific media structures.

The recording layer consists of at least a first and a second recording sublayer. The materials of the first and the second recording sublayer are chosen such that they can be burned to form an alloy which has phase-change properties. At the same time the optical contrast due to alloying of the materials needs to be high enough to gain sufficient modulation for a write-once optical recording medium.

First the optical recording medium is used like a conventional write-once medium showing high reflectivity and modulation. Then, due to the phase-change properties, the reflectivity and the modulation can be reduced in certain areas of the medium in a second recording step. Two possibilities can be distinguished in this respect.

The first possibility is a reduction of modulation. The reflectivity is slightly changed without disturbing the normal data read-out. In this case the frequency of the reflectivity change preferably is much lower than the frequency of the HF-data stored in the form of alloyed marks. In this case only special drives are able to detect the reflectivity change and thus the data recorded using this reflectivity change. Low pass filtering allows to suppress the HF-data signal and to detect the slight reflectivity change.

One application of this mechanism is a kind of physical content protection. A decryption key or is stored in this slight reflectivity change. If the optical recording medium is copied using a state of the art optical recording medium and drive, this decryption key is lost and the recorded optical recording medium cannot be played. In addition to new optical recording media and new firmware for the recording devices, this application requires players with an adapted firmware and a slightly modified hardware to read the decryption key.

The second possibility is a total suppression of modulation. The reflectivity is changed such that the modulation vanishes completely in certain areas. This effect can be used in different ways. One application is to temporary hide information. Later the information can be recovered by a special recording procedure, because even though the contrast is zero the information is still stored in the marks of the recording layer. Temporary hiding of the marks and recovering is done by changing the state of the phase-change marks from amorphous to crystalline and vice versa.

Of course, other new applications might evolve in the future, which make use of the special properties of the proposed optical recording medium.

Advantageously, the materials of the at least first and second recording sublayers are chosen such that a recording power P1 necessary for changing the state of the alloyed material from amorphous to crystalline and a recording power P2 necessary for changing the state of the alloyed material from crystalline to amorphous are smaller than a recording power P3 necessary for alloying the materials. In other words, for both possibilities the structure of the optical recording medium needs to be optimized in such way that the recording power for the first recording process, i.e. alloying of the different recording sublayers, is substantially higher than the power needed to rewrite the marks having phase-change properties. This ensures that no data are destroyed by an additional alloying during a phase change recording process.

Favorably, the recording power P1 necessary for changing the state of the alloyed material from amorphous to crystalline is smaller than the recording power P2 necessary for changing the state of the alloyed material from crystalline to amorphous. This is a typical constraint for phase change recording media.

Advantageously, the recording process is a 'High-to-Low' process. In this case the reflectivity of the recorded marks is lower and, therefore, the absorption is higher. For the modulation reduction described above it is then easily ensured that during the rewriting process of the marks more heat is absorbed by the marks than by the land area, which has a high reflectivity and a low absorption. Then, independent of the state of the phase-change areas, the information which has been recorded in the first step remains unchanged during the rewriting process. The situation is different for the modulation suppression, because once the reflectivity has been changed such that the modulation vanishes completely, the absorption is nearly the same for the marks and the land area. Even then it is, however, possible to design the layer stack in such a way that the power needed for changing the phase-change state is much lower than for alloying the materials.

An appropriate write strategy, for example with a high recording speed and/or short write pulses, ensures that the state of the phase-change marks is amorphous directly after alloying. An additional recording step then allows to change the state of the phase-change marks from amorphous to crystalline.

Favorably, the recording layer includes a first, a second and a third recording sublayer consisting of three materials M1, M2 and M3, respectively. An advantageous composition of materials is M1=Ag, M2=$AgInTe_2$, and M3=$Sb_{70}Te_{30}$. In this case the thicknesses of each sublayer can be adjusted such that the burned alloy is close to $Ag_{12}In_4Sb_{55}Te_{29}$. In particular the amount of $AgInTe_2$ preferably is essentially 1.7 times the amount of Ag and the amount of $Sb_{70}Te_{30}$ preferably is essentially 9.2 times the amount of Ag. The corresponding thickness of each layer can be calculated with the average atom diameter of the elements Ag, In, Sb and Te.

With this material composition high reflectivity and modulation values are achieved. For example at a wavelength of 650 nm a reflectivity of 0.5 and a maximum modulation of 0.7 has been calculated. In praxis the modulation is slightly smaller due to the trade-off between modulation and jitter increase caused by cross-writing. Further, the reflectivity measured with focused beam is slightly smaller than the parallel beam reflectivity, which is assumed in the calculation that are discussed below with reference to the figures. However, the reflectivity-modulation product is sufficient to fulfill the specifications applicable to DVD (Digital Versatile Disc).

According to a further aspect of the invention, a method for reading data from an optical recording medium according to the invention has the steps of:
 illuminating the optical recording medium with a light beam;
 detecting data from a light beam reflected by the optical recording medium; and
 separating a data signal recorded using phase changes of the alloyed material from a data signal recorded using alloyed marks.

The method allows to retrieve both the data recorded using alloyed marks as well as the data recorded using phase changes of the alloyed material.

The above method is favorably implemented in an apparatus for reading data from an optical recording medium according to the invention.

Specifically, the apparatus has a light source for illuminating the optical recording medium with a light beam, a detector for detecting data from a light beam reflected by the optical recording medium, and a low pass filter for separating the data signal recorded using phase changes of the alloyed material from the data signal recorded using alloyed marks.

Advantageously, a decryption key is retrieved from the data signal recorded using phase changes of the alloyed material. In this way a physical content protection of the recorded data can easily be implemented, as already discussed above.

Similarly, a method for recording data on an optical recording medium according to the invention has the steps of:
 recording data on the optical recording medium using alloyed marks by illuminating the optical recording medium with a light beam having a recording power P3 necessary for alloying the materials of the recording sublayers; and
 recording data on the optical recording medium using phase changes of the alloyed material by illuminating the optical recording medium with a light beam having a recording power necessary for changing the state of the alloyed material from amorphous to crystalline or from crystalline to amorphous. The method makes use of the rewritable properties of the optical recording medium to store additional data.

The above method is favorably implemented in an apparatus for recording data on an optical recording medium according to the invention.

According to still a further aspect of the invention, a method for activating an optical recording medium according to the invention has the step of increasing the reflectivity and/or the modulation of the alloyed material by changing the state of the recorded marks from amorphous to crystalline by laser radiation or heat treatment. In this way use is made of rewritable properties of the optical recording medium to implement an additional security feature. Without activation it is not possible to retrieve the data recorded on the optical recording medium in a normal playback apparatus.

BRIEF DESCRIPTION OF THE DRAWINGS

For a better understanding the invention shall now be explained in more detail in the following description with reference to the figures. It is understood that the invention is not limited to this exemplary embodiment and that specified features can also expediently be combined and/or modified without departing from the scope of the present invention as defined in the appended claims. In the figures:

DETAILED DESCRIPTION OF PREFERRED EMBODIMENTS

Figure 1:
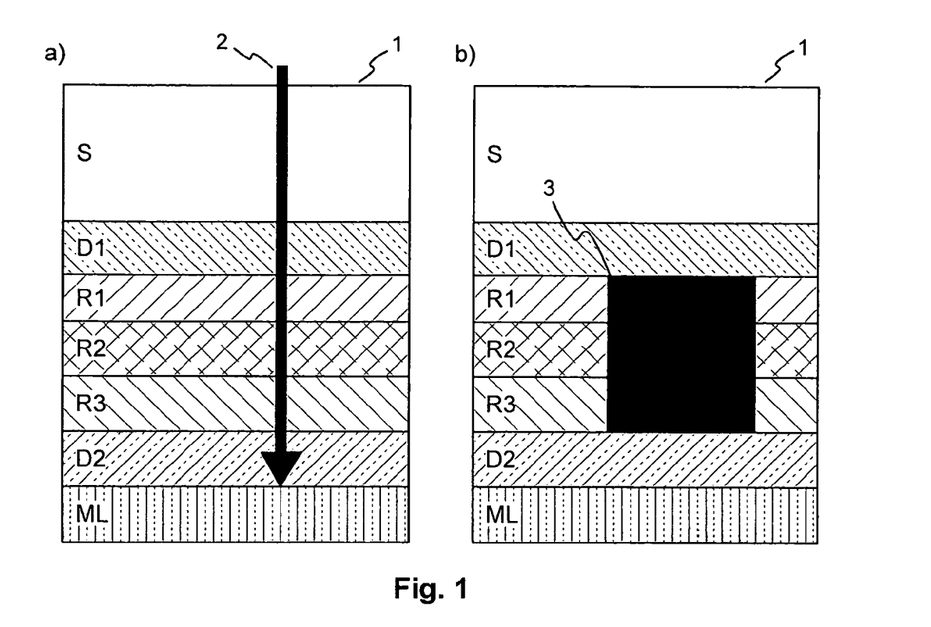
FIG. 1 illustrates the structure of an optical recording medium according to the invention.

FIG. 1 illustrates the structure of the optical recording medium 1 according to the invention. In the left part a) and the right part b) of FIG. 1 the structure is shown before and after recording a mark 3, respectively. The recording medium has a recording layer 4 consisting of a first recording sublayer 121, a second recording sublayer R2, and a third recording sublayer R3. The recording sublayers R1, R2, R3 are sandwiched between two dielectric layers D1, D2. Arranged above the first dielectric layer D1 is a substrate or cover layer S. Below the second dielectric layer D2 is a mirror layer ML. During recording with high power laser pulses 2 recorded marks 3 are formed by alloying. After recording the status of the recorded marks 3 is amorphous. Of course, it is likewise possible to use only two or more than three recording sublayers.

Two examples of the structure of the optical recording medium 1 will be discussed in more detail in the following. The examples are adapted to a wavelength of 650 nm. Of course, the invention can also be realized for other wavelengths suitable for CD (Compact Disc), DVD (Digital Versatile Disc), HD-DVD (High Density Digital Versatile Disc) or BD (Blu-ray Disc) and so on, e.g. for 405 nm. The following materials are used for the calculation of reflectivity and modulation:

Ag
$AgInTe_2$
$Sb_{70}Te_{30}$

In this case the thickness of $AgInTe_2$ needs to be 1.51 times the thickness of Ag, and the thickness of $Sb_{70}Te_{30}$ needs to be 8.2 times the thickness of Ag in order to reach the right composition of the recorded marks (approximately $Ag_{12}In_4Sb_{55}Te_{29}$). Values for the real part n and the imaginary part k of the refractive index at a wavelength between 633 nm and 650 nm were derived from measurements or retrieved from the literature ([1]M. M. El-Nahass et al.: "*Structural and optical properties of flash evaporated AgInTe thin films*", Eur. Phys. J. Appl. Phys. (2006), pp. 75-83; [2]Y. C. Her et al.: "*Effects of Ag and In addition on the optical properties and crystallization kinetics of eutectic $Sb_{70}Te_{30}$ phase-change recording film*", J. Appl. Phys. 93 (2003), pp. 10097-10103) and are summarized in the below Table 1. Further, it can reasonably be assumed that all materials are very close to the amorphous state after sputtering.

TABLE 1

Relevant refractive indices

| Material | amorphous/ crystalline | Wavelength [nm] | n | k | Source |
|---|---|---|---|---|---|
| Ag | as deposited | 633 | 0.092 | 4.2 | measured |
| $AgInTe_2$ | as deposited | 650 | 3.64 | 0.28 | [1] |
|  | annealed | 650 | 3.58 | 0.20 | [1] |
| $Sb_{70}Te_{30}$ | amorphous | 650 | 3.7 | 2.6 | [2] |
|  | crystalline | 650 | 4.6 | 4.8 | [2] |
| $Ag_{12}In_4Sb_{55}Te_{29}$ | amorphous | 650 | 4.17 | 1.86 | [2] |
|  | crystalline | 650 | 3.07 | 3.66 | [2] |

The first exemplary structure of the optical recording medium 1 according to the invention is summarized below in Table 2. The aim of this structure is a reduction of modulation.

TABLE 2

First exemplary structure

| Layer | Material | Thickness [nm] |
|---|---|---|
| D1 | $ZnS$—$SiO_2$ | 80 |
| R1 | Ag | 2-7 |
| R2 | $Sb_{70}Te_{30}$ | 17-60 |
| R3 | $AgInTe_2$ | 3-11 |
| D2 | $ZnS$—$SiO_2$ | 98 |
| ML | Ag-alloy | 100 |
| Max. R × M |  | 0.37 |

Calculations based on algorithms for parallel beam reflection indicate that for the proposed layer structure and materials the reflectivity change due to alloying of the two materials is sufficient for applications in recordable optical recording media.

Figure 2:
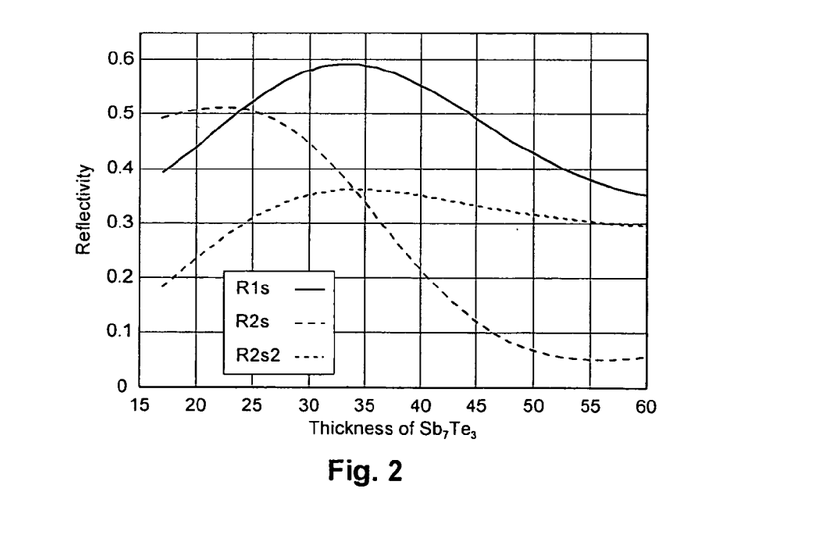
FIG. 2 shows calculated values for parallel beam reflectivity for a first medium structure.

FIG. 2 shows the calculated values for parallel beam reflectivity in dependence on the thickness of the $Sb_{70}Te_{30}$ sublayer. The solid curve (R1s) shows the reflectivity before recording, the long-dashed curve (R2s) shows the reflectivity after recording (amorphous), and the short-dashed curve (R2s2) shows the reflectivity for the crystalline state of the recorded material.

Figure 3:
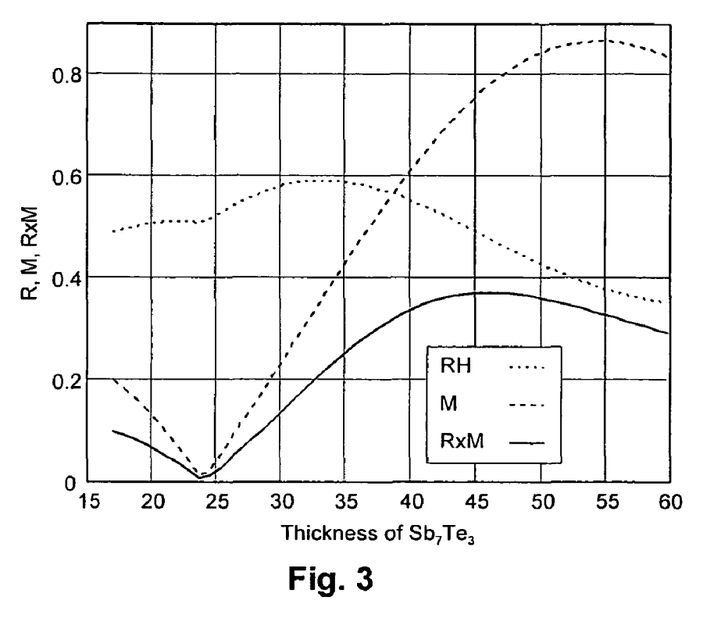
FIG. 3 depicts calculated values for parallel beam reflectivity, modulation and the reflectivity-modulation product for an amorphous state of the recorded alloy.

FIG. 3 shows the calculated values for the reflectivity R, the modulation M and the reflectivity-modulation product R×M for a parallel beam in dependence on the thickness of the SbTe sublayer. Here RH represents the highest reflectivity, corresponding to R14H of a DVD (Digital Versatile Disk). The state of AgInSbTe is amorphous. The maximum reflectivity-modulation product R×M is reached at a SbTe sublayer thickness of 46 nm.

As shown in FIGS. 2 and 3, the reflectivity after recording, i.e. the reflectivity of the recorded marks 3, is strongly reduced and reflectivity and modulation values above R=0.5 and M=0.6 can be reached. The structure of the optical recording medium 1 has been optimized for R, M and the product R×M. The maximum value for R×M reaches about 0.37, which is much more than the specified value for DVD (R×M>0.27). Even if a small decrease of R due to the focused beam and of M due to the optimum recording power is taken into consideration, the remaining values are sufficient.

Figure 4:
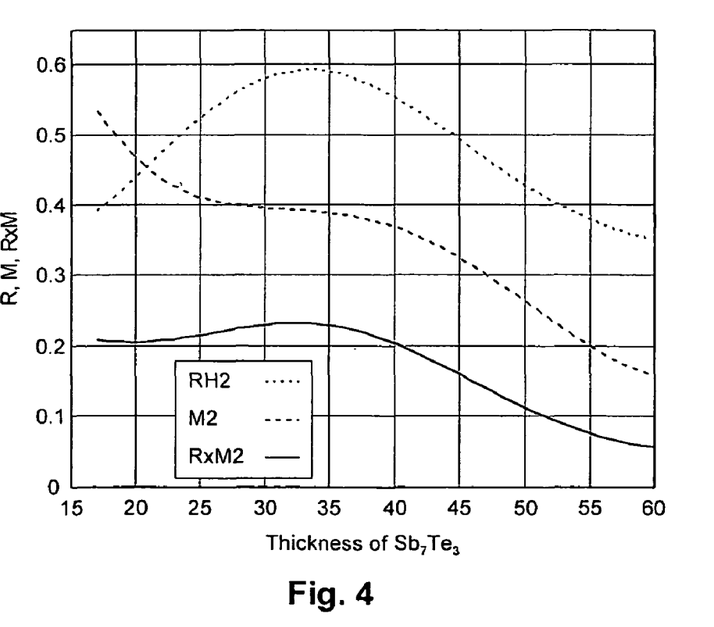
FIG. 4 shows calculated values for parallel beam reflectivity, modulation and the reflectivity-modulation product for a crystalline state of the recorded alloy.

In a next step the reflectivity and the modulation are calculated for the same thicknesses, but with a crystalline state for the recorded marks. The result is shown in FIG. 4, which illustrates the calculated values for R, M and R×M for a parallel beam depending on the thickness of the SbTe sublayer. The upper curve with higher reflectivity is the same as in FIG. 2. However, for a thickness of the SbTe sublayer above 34 nm the modulation is reduced. This is due to the slightly higher reflectivity values for the crystalline state of the recorded marks. The maximum reflectivity is the same as before, but for a certain thickness range of the SbTe sublayer the modulation is reduced. For example, for a thickness of 40 nm, the modulation is 0.37 compared to 0.61 for the amorphous phase of AgInSbTe.

In other words, if the thickness of the SbTe sublayer is 40 nm, the modulation directly after the first recording is about 0.61. After changing from amorphous to crystalline, the modulation is reduced to 0.37. Depending on the thickness of the SbTe sublayer a stronger change in the modulation can be achieved or, if the thickness is reduced below 34 nm, the modulation change can be inverted. In that case the modulation after recording is low (corresponding to the amorphous state) and can be increased by a second step (crystallization process). For example, if the thickness of the SbTe sublayer is 30 nm, the modulation directly after the first recording is about 0.25. After changing from amorphous to crystalline, the modulation is increased to 0.4. This demonstrates that the thickness can be adjusted in such way that the required reflectivity and modulation values are achieved.

The below Table 3 shows reflectivity and modulation values for different thicknesses of the SbTe sublayer and for different states of the recorded marks (amorphous, crystalline). The maximum value for R×M reaches about 0.37 with a SbTe sublayer thickness of 46 nm (0.48×0.78=0.37).

TABLE 3

Reflectivity and modulation values

| Thickness of Ag [nm] | 3.7 | 4.3 | 4.9 | 5.6 | 6.1 | 6.7 |
|---|---|---|---|---|---|---|
| Thickness of SbTe [nm] | 30.1 | 35.1 | 40 | 46 | 50 | 54.9 |
| Thickness of AgInTe [nm] | 5.5 | 6.5 | 7.4 | 8.5 | 9.2 | 10.1 |
| High reflectivity (unrecorded) | 0.587 | 0.592 | 0.554 | 0.479 | 0.429 | 0.381 |
| Low reflectivity amorphous | 0.442 | 0.333 | 0.212 | 0.105 | 0.067 | 0.051 |
| Modulation amorphous | 0.247 | 0.438 | 0.617 | 0.781 | 0.845 | 0.866 |
| Low reflectivity crystalline | 0.352 | 0.360 | 0.349 | 0.328 | 0.315 | 0.303 |
| Modulation crystalline | 0.400 | 0.392 | 0.370 | 0.315 | 0.266 | 0.205 |
| Max. R × M | | | | 0.374 | | |

TABLE 4

Second exemplary structure

| Layer | Material | Thickness [nm] |
|---|---|---|
| D1 | ZnS—SiO$_2$ | 7 |
| R1 | AgInTe$_2$ | 4-9 |
| R2 | Ag | 3-6 |
| R3 | Sb$_{70}$Te$_{30}$ | 22-50 |
| D2 | ZnS—SiO$_2$ | 105 |
| ML | Ag-alloy | 100 |
| Max. R × M | | 0.29 |

Directly after recording the marks, which are formed of AgInSbTe, are in an amorphous state due to the recording process using short pulses with a high peak power P3. The reflectivity and modulation values are shown in FIG. 2 (long-dashed curve) and FIG. 3. By application of longer pulses or constant laser radiation with a lower peak power P1 the status of the marks is changed from amorphous to crystalline, resulting in the reflectivity and modulation values shown in FIG. 2 (short-dashed curve) and FIG. 4. Then, by application of short pulses with an average peak power P2 and a pulse frequency higher than the clock frequency of the data the marks can be switched back to the amorphous state. Alternatively DC amorphization can be used by applying a constant laser power at a high rotation speed.

The condition for the recording powers is as follows:

P1<P2<P3

The first condition P1<P2 is the same as for known rewritable media. The second condition P2<P3 is needed to avoid additional alloying of the recording sublayers R1, R2, R3, which would destroy (i.e. delete) the recorded data. In the present example this can easily be achieved, as the reflectivity of the crystalline recorded marks is still lower than the reflectivity of the unrecorded area. Consequently, the absorption of the crystalline recorded marks is higher than the absorption of the unrecorded area. That means that for this switching between the amorphous state and the crystalline state and vice versa the laser pulses can be applied without knowledge of the channel data even with a laser power P2 close to P3.

The second exemplary structure of the optical recording medium 1 according to the invention is summarized below in Table 4. The aim of this structure is a reversible total suppression of the modulation.

Figure 5:
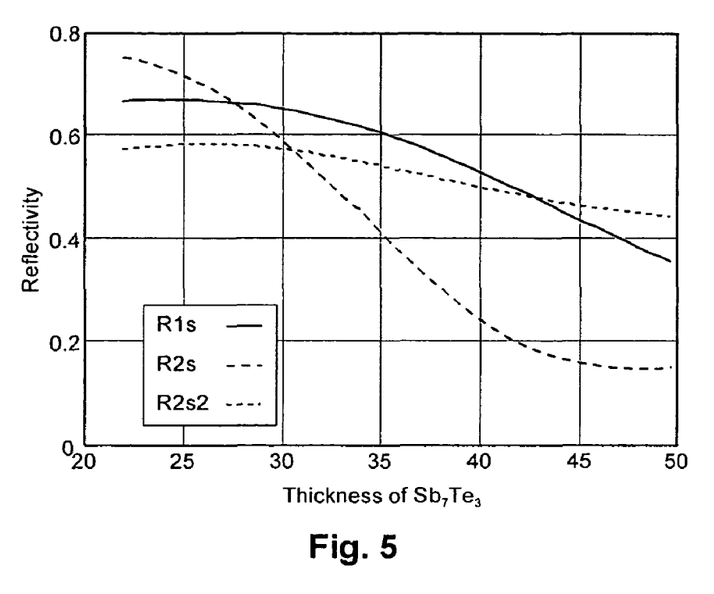
FIG. 5 shows calculated values for parallel beam reflectivity for a second medium structure.

FIG. 5 shows the calculated values for parallel beam reflectivity in dependence on the thickness of the SbTe sublayer. The solid curve shows the reflectivity before recording, the long-dashed curve shows the reflectivity after recording (amorphous) and the short-dashed curve shows the reflectivity for the crystalline state of the recorded material.

Figure 6:
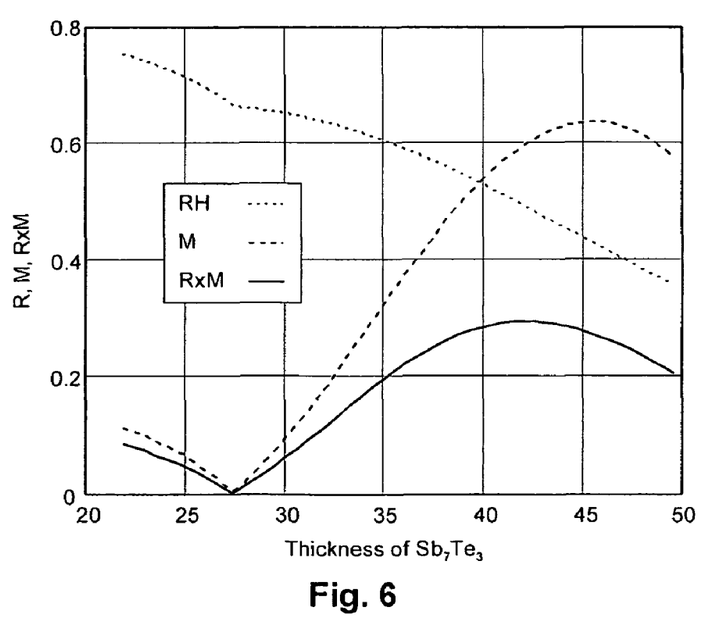
FIG. 6 depicts calculated values for parallel beam reflectivity, modulation and the reflectivity-modulation product for an amorphous state of the recorded alloy.

FIG. 6 shows the calculated values for the reflectivity R, the modulation M and the reflectivity-modulation product R×M for a parallel beam in dependence on the thickness of the SbTe sublayer. Here RH represents the highest reflectivity, corresponding to R14H of a DVD (Digital Versatile Disk). The state of AgInSbTe is amorphous.

Figure 7:
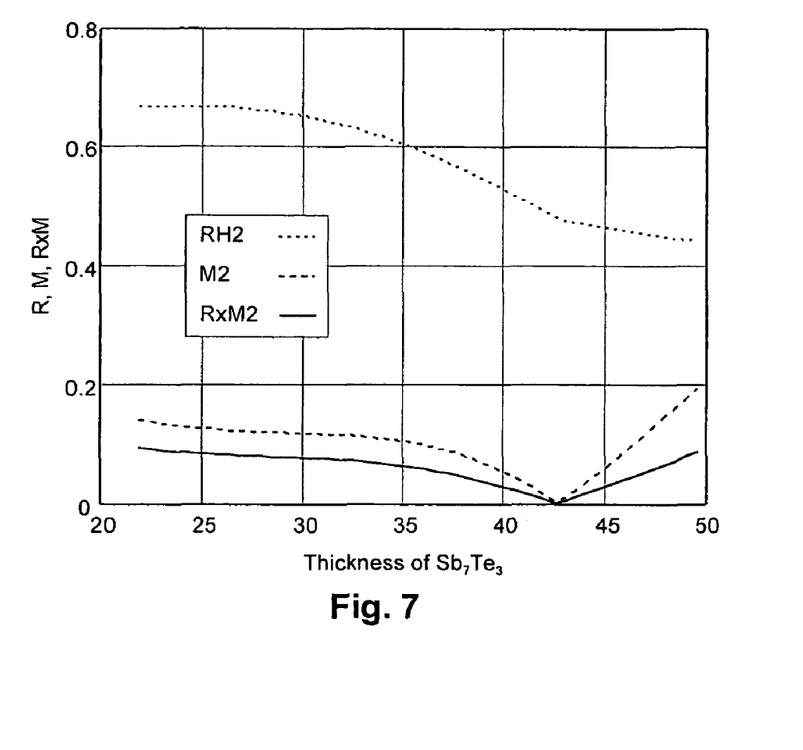
FIG. 7 shows calculated values for parallel beam reflectivity, modulation and the reflectivity-modulation product for a crystalline state of the recorded alloy.

FIG. 7 shows the calculated values for the reflectivity R, the modulation M and the reflectivity-modulation product R×M for a parallel beam in dependence on the thickness of the SbTe sublayer. The state of AgInSbTe is crystalline. At 42.5 nm thickness the modulation is completely suppressed. The maximum reflectivity is the same as before, except below 27.3 nm, where the reflectivity of the recorded marks is higher than the initial state, and except above 42.5 nm, where the maximum reflectivity is increased due to the change from amorphous to crystalline.

The thicknesses of the sublayers are adjusted in such way that the modulation for the crystalline state of the recorded marks vanishes at one or more thicknesses of the SbTe sublayer. As shown in FIG. 5 and FIG. 7, zero modulation is reached at a thickness of the SbTe sublayer where the solid high reflectivity curve crosses the short-dashed reflectivity curve for the crystalline state of the recorded marks. In the following the crossing point at 42.5 nm thickness is discussed. The modulation after recording at 42.5 nm thickness is about 0.6. As can be seen from FIG. 6, the reflectivity-modulation product R×M is about 0.3 for the amorphous state of the recorded marks.

As in the first example, directly after recording the marks, which are formed of AgInSbTe, are in an amorphous state due to the recording process using short pulses with a high peak power P3. The reflectivity and modulation values are shown in FIG. 5 (long-dashed curve) and FIG. 6. By application of longer pulses or constant laser radiation with a lower peak power P1 the status of the marks is changed from amorphous to crystalline, resulting in the reflectivity and modulation values shown in FIG. 5 (short-dashed curve) and FIG. 7. Then, by application of short pulses with an average peak power P2 and a pulse frequency higher than the clock frequency of the data the marks can be switched back to the amorphous state. Alternatively DC amorphization can be used by applying a constant laser power at a high rotation speed.

The condition for the recording powers is as follows:

P1<P2<P3

As already discussed above for the first exemplary structure the first condition P1<P2 is the same as for known rewritable media. The second condition P2<P3 is needed to avoid additional alloying of the recording sublayers R1, R2, R3. In comparison to the first exemplary structure the power P2 needs to be higher, because the reflectivity of the crystalline recorded marks is higher and the absorption is thus lower. That means that for this switching between the amorphous state and the crystalline state and vice versa the laser pulses can be applied without knowledge of the channel data, but maintaining the condition P2<P3 more rigorously than in the previous example.

Figure 8:
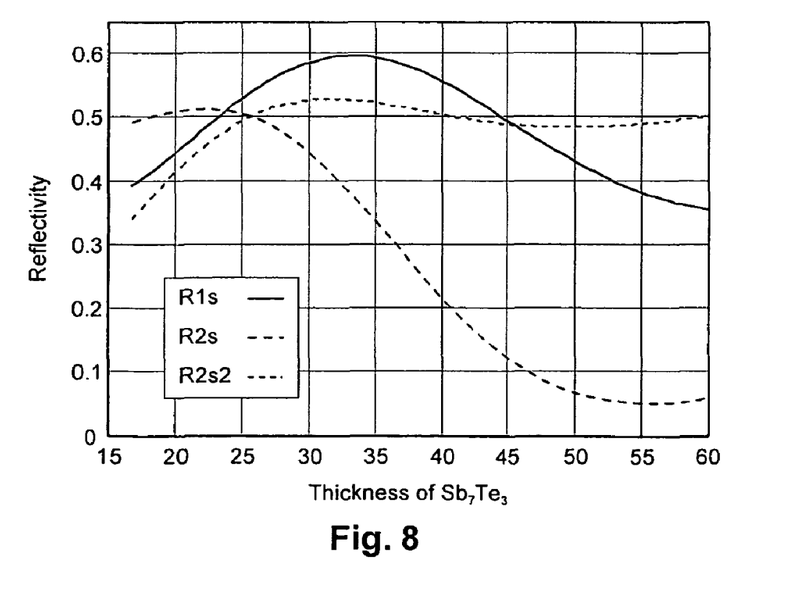
FIG. 8 depicts calculated values for parallel beam reflectivity for the first medium structure taking into account a crystalline state of one recording sublayer, and FIG. 9 schematically illustrates an apparatus for reading data from and/or recording data on an optical recording medium according to the invention.

For both examples discussed above it may happen that the state of the material in the SbTe sublayer is changed from amorphous (as deposited) to partial crystalline in the unrecorded areas between the marks. This would, however, influence the resulting reflectivity and modulation values only in a very limited way. FIG. 8 shows the calculated values for parallel beam reflectivity in dependence on the thickness of the SbTe sublayer. The solid curve shows the reflectivity before recording, the long-dashed curve shows the reflectivity after recording (amorphous) and the short-dashed curve shows the reflectivity before recording, but with a crystalline state of the SbTe sublayer. The layer stack used for the calculation is the one shown in Table 2, i.e. the first exemplary structure. As can be seen, the effects described for the two examples are not suppressed by this change. The short-dashed curve is only slightly changed in comparison to the solid curve. In particular for the thickness of 46 nm, which gives the highest modulation, the difference is quite small.

Figure 9:
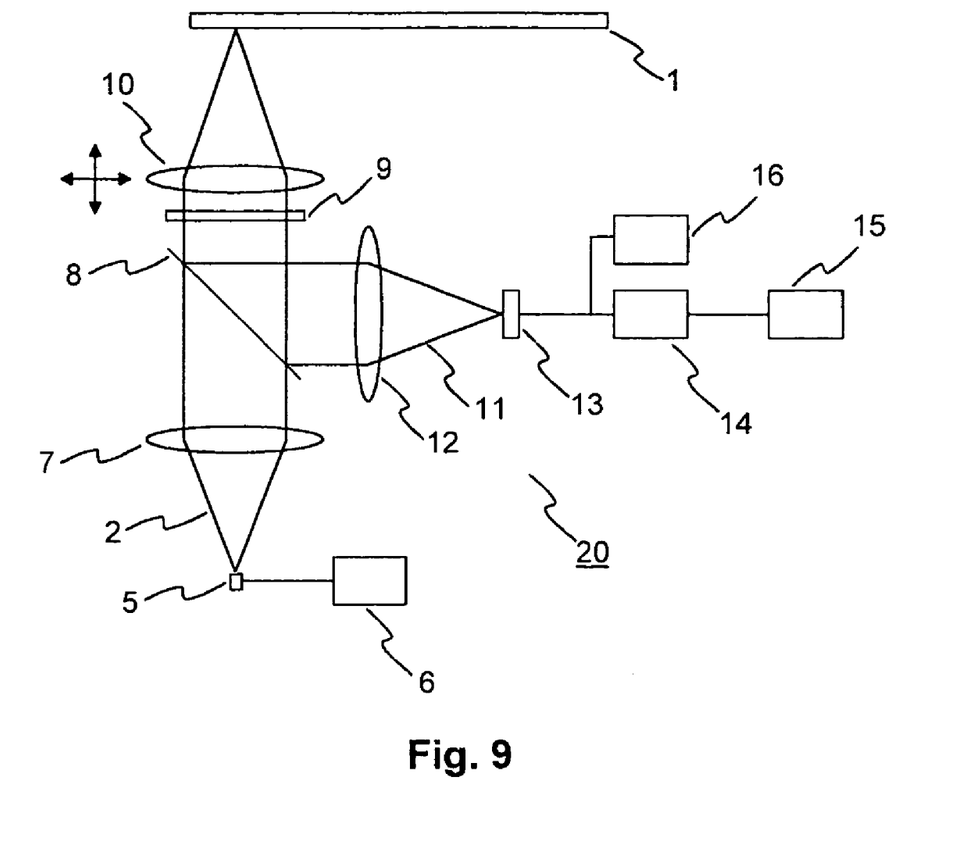

An apparatus 20 for reading data from and/or recording data on an optical recording medium 1 according to the invention is schematically illustrated in FIG. 9. A laser diode 5, which is controlled by a controller 6, emits a linearly polarized light beam 2, which is collimated by a collimator lens 7. The collimated light beam 2 passes a polarization beam splitter 8 and a quarter wave plate 9, which transforms the light beam 2 into a circular polarized light beam 2, before it is focused onto the optical recording medium 1 by an objective lens 10. The light beam 11 reflected by the optical recording medium 1 is collimated by the objective lens 10 and passes the quarter wave plate 9, which transforms the reflected light beam 11 into a linear polarized light beam 11. Due to the quarter wave plate 9, the direction of polarization of the reflected light beam 11 is perpendicular to the direction of polarization of the initial light beam 2. The reflected light beam 11 is thus deflected by the polarization beam splitter 8 towards a focusing lens 12, which focuses the reflected light beam 11 onto a detector 13. A first evaluation circuitry 16 evaluates the signals obtained by the detector 13 to obtain the data signal recorded using alloyed marks. A low pass filter 14 separates the data signal recorded using phase changes of the alloyed material from the data signal recorded using alloyed marks. A second evaluation circuitry 15 evaluates the signal transmitted by the low pass filter 14 to obtain the data signal recorded using phase changes of the alloyed material.

What is claimed is:

1. An optical recording medium, with a recording layer comprising at least a first recording sublayer and a second recording sublayer, wherein the materials of the at least first and second recording sublayers are adapted to form an alloyed material upon illumination with a recording light beam, and wherein the alloyed material is a phase-change material, and wherein the materials of the at least first and second recording sublayers are adapted to record a first set of data as alloyed marks by alloying material of the at least first and second recording sublayers and to record a second set of data as phase changes of the alloyed material of the alloyed marks.

2. The optical medium according to claim 1, wherein the alloyed material is a "High-to-Low" material.

3. The optical recording medium according to claim 1, wherein the materials of the at least first and second recording sublayers are chosen such that a first recording power necessary for changing the state of the alloyed material from amorphous to crystalline and a second recording power necessary for changing the state of the alloyed material from crystalline to amorphous are smaller than a third recording power necessary for alloying the materials.

4. The optical recording medium according to claim 3, wherein the first recording power necessary for changing the state of the alloyed material from amorphous to crystalline is smaller than the second recording power necessary for changing the state of the alloyed material from crystalline to amorphous.

5. The optical recording medium according to claim 1, wherein the phase changes of the alloyed material results in a reduction or a suppression of modulation.

6. The optical recording medium according to claim 1, wherein the recording layer comprises three recording sublayers.

7. The optical recording medium according to claim 6, wherein the three recording sublayers consist of $AgInTe_2$, $Ag$, and $Sb_{70}Te_{30}$, respectively.

8. The optical recording medium according to claim 1, wherein the optical recording medium comprises a decryption key encoded by phase changes of the alloyed material.

9. A method for reading data from an optical recording medium according to claim 1, the method comprising:
    illuminating the optical recording medium with a light beam;
    detecting data from a light beam reflected by the optical recording medium; and
    separating a data signal stemming from phase changes of the alloyed material from a data signal stemming from alloyed marks.

10. The method according to claim 9, the method further comprising retrieving a decryption key from the data signal stemming from phase changes of the alloyed material.

11. An apparatus for reading data from an optical recording medium according to claim 1, with a light source for illuminating the optical recording medium with a light beam, and with a detector for detecting data from a light beam reflected by the optical recording medium, wherein the apparatus is adapted to perform:
    illuminating the optical recording medium with a light beam;
    detecting data from a light beam reflected by the optical recording medium; and separating a data signal stemming from phase changes of the alloyed material from a data signal stemming from alloyed marks.

12. The apparatus according to claim 11, wherein the apparatus includes a low pass filter for separating the data signal stemming from phase changes of the alloyed material from the data signal stemming from alloyed marks.

13. A method for recording data on an optical recording medium according to claim 1, the method comprising:
   recording a first set of data on the optical recording medium using alloyed marks by illuminating the optical recording medium with a light beam having a recording power P3 necessary for alloying the materials of the recording sublayers; and
   recording a second set of data on the optical recording medium using phase changes of the alloyed material by illuminating the optical recording medium with a light beam having a second recording power necessary for changing the state of the alloyed material from crystalline to amorphous or having a first recording power necessary for changing the state of the alloyed material from amorphous to crystalline.

14. An apparatus for recording data on an optical recording medium according to claim 1, with a light source for illuminating the optical recording medium with a light beam, wherein the apparatus is adapted to perform:
   recording a first set of data on the optical recording medium using alloyed marks by illuminating the optical recording medium with a light beam having a recording power necessary for alloying the materials of the recording sublayers; and
   recording a second set of data on the optical recording medium using phase changes of the alloyed material by illuminating the optical recording medium with a light beam having a second recording power necessary for changing the state of the alloyed material from crystalline to amorphous or having a first recording power necessary for changing the state of the alloyed material from amorphous to crystalline.

* * * * *